United States Patent
Menke

(10) Patent No.: US 7,248,154 B2
(45) Date of Patent: Jul. 24, 2007

(54) WEAR DETECTION BY TRANSPONDER DESTRUCTION

(75) Inventor: Lucas Menke, Munich (DE)

(73) Assignee: Meri Entsorgungstechnik fur die Papierindustrie GmbH, Munich (DE)

( * ) Notice: Subject to any disclaimer, the term of this patent is extended or adjusted under 35 U.S.C. 154(b) by 123 days.

(21) Appl. No.: 11/101,828

(22) Filed: Apr. 8, 2005

(65) Prior Publication Data

US 2006/0226984 A1  Oct. 12, 2006

(51) Int. Cl.
*B60Q 1/00* (2006.01)

(52) U.S. Cl. ............... 340/454; 116/208; 188/1.11 W; 340/680

(58) Field of Classification Search ............... 340/438, 340/454, 442, 679, 680, 572.1; 188/1.11 W; 116/208

See application file for complete search history.

(56) References Cited

U.S. PATENT DOCUMENTS

| 2002/0116992 A1* | 8/2002 | Rickel ..................... 73/146 |
| 2004/0222084 A1* | 11/2004 | Wigg et al. ............ 204/196.06 |
| 2006/0042734 A1* | 3/2006 | Turner et al. ............ 152/154.2 |
| 2006/0124214 A1* | 6/2006 | Bauchot et al. .......... 152/154.2 |
| 2006/0208902 A1* | 9/2006 | Brey ....................... 340/572.8 |

FOREIGN PATENT DOCUMENTS

| EP | 0753 472 | 1/1997 |
| WO | WO 00/53517 | 9/2000 |
| WO | WO 02/072452 | 9/2002 |

* cited by examiner

*Primary Examiner*—Brent A. Swarthout
(74) *Attorney, Agent, or Firm*—Schwegman, Lundberg, Woessner & Kluth, P.A.

(57) ABSTRACT

The invention relates to a system and a method for the detection of the wear state of machine parts which are subject to mechanical wear, by means of an electronic transmitting/receiving device (38) and at least one transponder device (36), which is embedded in the machine part (16) and sends back an acknowledgement signal in response to a transmitted signal which is transmitted by the transmitting/receiving device (38), in which case the reaching of a predetermined wear value can be indicated by the destruction of the transponder device (36) and by the lack of the acknowledgement signal associated with this. The invention is based on the discovery that the arrangement of a transponder device at a specific position which is a measure of a predetermined wear state means that the operational readiness of the transponder device, on the one hand, is indicated in advance by its signal return, and the reaching of the predetermined wear value is indicated by its destruction.

25 Claims, 2 Drawing Sheets

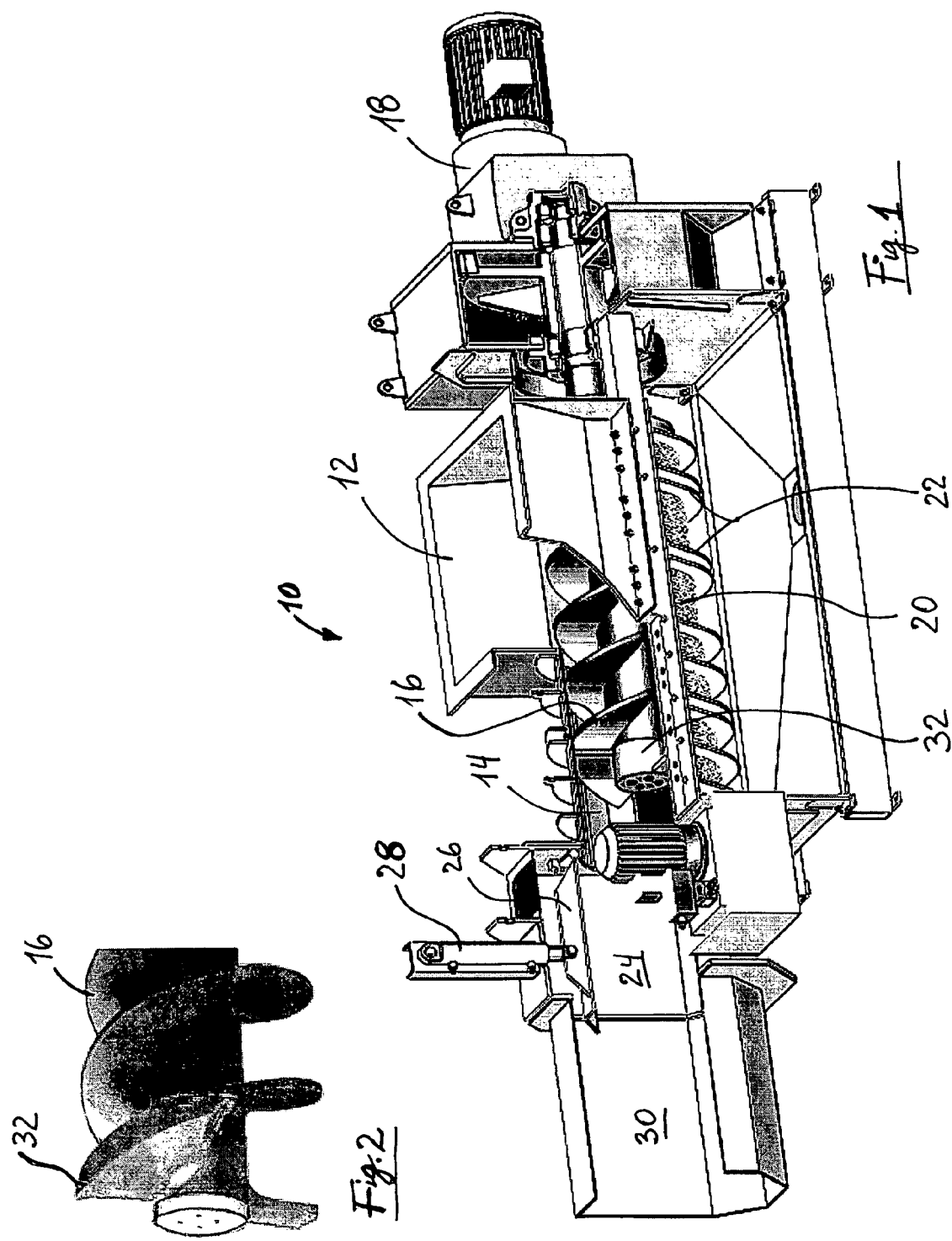

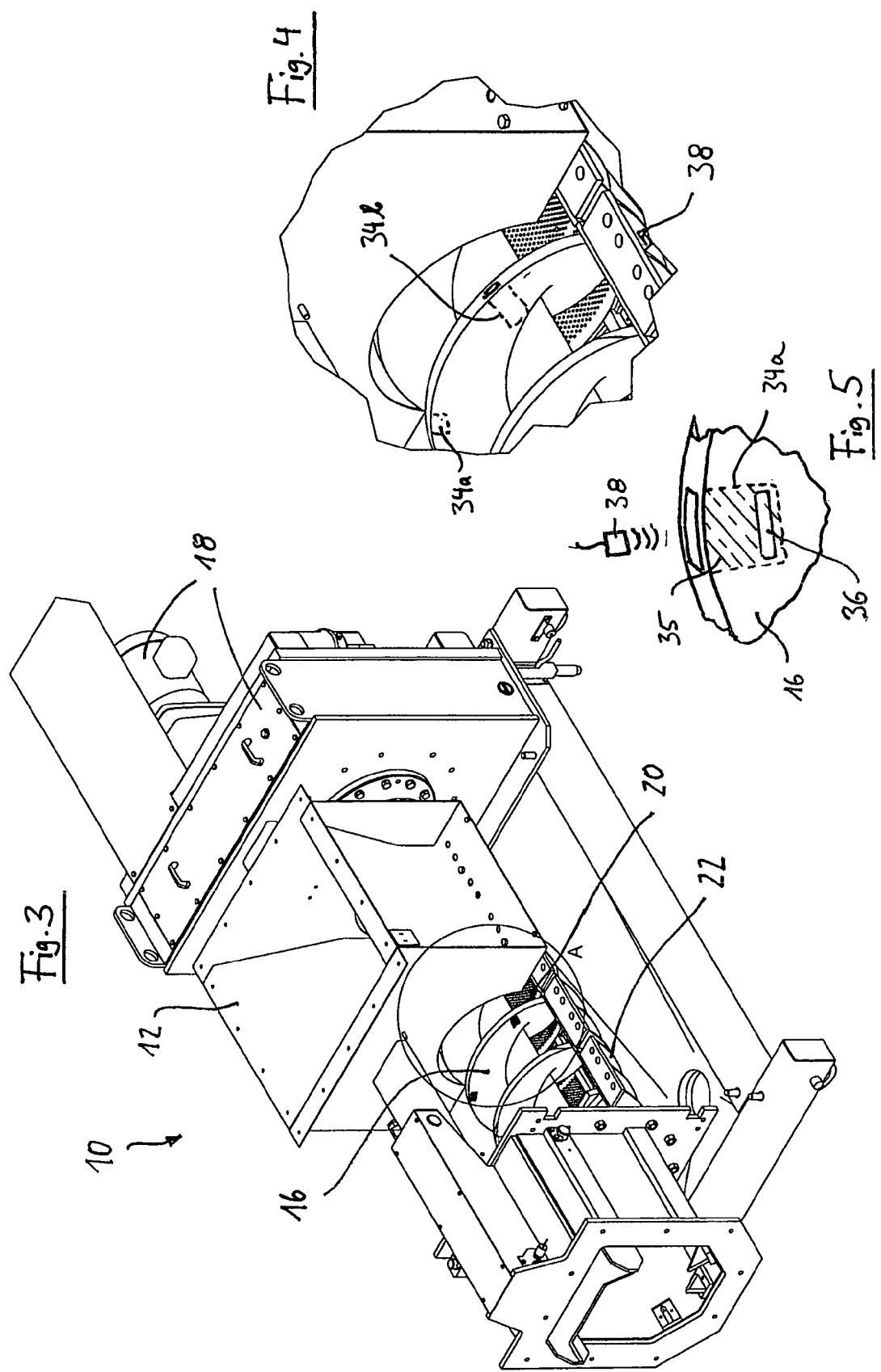

WEAR DETECTION BY TRANSPONDER DESTRUCTION

BACKGROUND OF THE INVENTION

1. Technical Field of the Invention

The invention relates to a system for the detection of the wear state of machine parts which are subject to mechanical wear, by means of an electronic transmitting/receiving device and at least one transponder device which is embedded in the machine part and sends back an acknowledgement signal in response to a transmitted signal which is transmitted by the transmitting/receiving device.

2. Description of the Prior Art

Many technical fields relating to heavy machine construction make use of machine parts which are subject to the influence of large forces during operation, and are thus continuously subject to high wear. By way of example, in the field of waste separation and reprocessing and mining machines, large feed or processing apparatuses such as drills or worm feeds are used, which are subject to relatively rapid wear, in which case the wear state and/or the reaching of a wear limit must be indicated reliably in order that the worn machine part can be replaced in good time.

DE 102 27 677 discloses a method for wire-free monitoring of the state of a machine part that is subject to wear by means of transponders, with an electrical conductor track structure being proposed which is worn together with the machine part, and with this conductor track structure being connected to a transponder and sending a response signal as a function of the state of the conductor track structure. This arrangement is not suitable for use for machine parts subject to major mechanical wear.

DE 198 40 081 discloses a system for monitoring the wear state of a layer, in which a transponder is provided underneath the layer and an electromagnetically shielding layer is embedded in the layer that is subject to wear and prevents signals from being interchanged between the transmitting/receiving device and the transponder, so that a signal interchange such as this is possible after the destruction of this layer, and this indicates the destruction state.

One disadvantage of this system is that the failure of the transponder before the destruction of the shielding layer is not indicated, because this does not receive and cannot transmit any signal, with the possible consequence that, in a situation such as this, the detection device assumes that the layer is still intact with the shielding layer embedded in it, while the layer has possibly already been totally destroyed.

SUMMARY OF THE INVENTION

Against this background, the invention is based on the object of providing a detection system of this generic type, which is particularly effective in especially rugged operating conditions, and in which heavy metallic machine parts are used.

According to the invention, this object is achieved by the features specified in claim 1. Advantageous developments are specified in the dependent claims.

The invention is based on the discovery that the arrangement of a transponder device at a specific position which is a measure of a predetermined wear state means that the operational readiness of the transponder device, on the one hand, is indicated in advance by its signal return, and the reaching of the predetermined wear value is indicated by its destruction. In order to indicate different wear states two or more transponder devices which return different signals can be provided at different positions {with respect to the wear state), whose Successive destruction one after the other is a measure of the wear state of the machine part.

In this case, the transponder device operates with amplitude modulation (AM). This transmission method is particularly suitable for use in metallic machine parts, since frequency-modulated transponder devices can produce erroneous signals owing to the metallic environment. The transponder devices according to the invention preferably operate on the RFID (radio frequency identification) principle.

In this case, a depression which is open in the direction of the transmitting/receiving device is provided in the machine part for the transponder device, in which depression the transponder device is inserted. One such depression with a predetermined depth is preferably incorporated on the circumference of a rotating component. This depression, with the transponder device located in it, is advantageously filled with a suitable synthetic resin, which is heat-resistant and/or pressure-resistant, depending on the application. In order to further increase the wear resistance, the synthetic resin preferably has non-metallic filling particles added to it. Particular wear-resistance or hardness can be achieved by ceramic particles, which do not at the same time adversely affect, or scarcely adversely affect, the signal flow between the transmitting/receiving device and the transponder device.

It is particularly appropriate for the transponder to use an operating frequency of about 50 kHz-about 300 kHz, to be elongated or in the form of a disk, and to have a length of about 10 to 20 mm. Particularly suitable transponders are manufactured by Sokymat S. A., Switzerland, preferably those with the designation "Glass Tag Unique 3.15×13.3" or "LOCI TAG 120 Unique."

The invention will be explained in more detail in the following text with reference to one preferred exemplary embodiment.

BRIEF DESCRIPTION OF THE DRAWINGS

In the figures:

FIG. 1 shows a perspective, partially sectioned illustration of a residual material compression apparatus;

FIG. 2 shows a perspective detail of a feed and compression worm drive in the apparatus shown in FIG. 1;

FIG. 3 shows a different perspective illustration of the waste material compression apparatus shown in FIG. 1;

FIG. 4 shows a perspective detail of the feed and compression worm drive shown in FIG. 3; and FIG. 5 shows a partial axial view of the compression worm drive shown in FIG. 4.

DETAILED DESCRIPTION OF THE PREFERRED EMBODIMENT OF THE INVENTION

FIGS. 1 and 3 show the same machine, which is a residual material compression apparatus 10 (a so-called compactor) for disposal of residual material from sewage processing, in which the residual materials (so-called rejects), which have been separated by means of various separation methods, are compressed to a major extent with the aim of compacting them as much as possible. This residual material compression apparatus has an inlet 12 which communicates with a cylindrical compression area 14, in which a worm 16 is arranged, which is driven via a drive device 18 that is not illustrated in any more detail. The cylindrical wall 20 of the compression area 14 is provided with apertures for liquid to pass through during the pressing process, and with radial, annular reinforcing ribs 22.

A pressing zone 24 is provided in front of the axial free end of the worm 16 and surrounds at least one pressing plate 26 which can be operated via a hydraulic device 28. An outlet 30 for the pressed goods is provided downstream from this.

During operation, the residual materials (rejects) to be pressed are inserted through the inlet 12 and are fed by means of the worm 16 in the direction of the pressing zone 24, being compressed in the process, with any liquid that is still contained therein being forced out and emerging through the apertures in the wall 20. Depending on the quantity of residual materials involved, the pressing plate 26 is in this case set via the hydraulic device 28 such that an adequate resistance and thus adequate compacting of the residual materials (which are supplied to the pressed goods outlet 30 downstream from the pressing zone 24) is achieved.

The front end of the worm 16 may in this case be provided with a wear tip 32 in order to reduce the wear, which wear tip 32 is composed of particularly hard and wear-resistant material, and which can be replaced in the event of wear, so that it is possible to delay the timing of the replacement of the rest of the worm 16, which is subject to less wear.

In a residual material compression apparatus 10 such as this, the compacted residual materials comprise materials of different coarseness and hardness, from metal parts via stones to softer and smaller parts. In any case, owing to the high compression load, these residual materials contribute to an extraordinary amount of wear both to the worm 16 and, above all (if fitted) to the wear tip 32 which, even when using the hardest steel alloys and hard coatings, must be replaced within a few months during normal operation. With regard to these severe operating conditions, detection of the wear state of the worm 16 and of the wear tip 32 during continuous operation problematic since the use of conventional measurement systems in the relevant area close to the pressing zone 24 is problematic, owing to the character of the residual materials and the prevailing conditions.

According to one preferred exemplary embodiment, two or more depressions 34a and 34b are provided on the circumference of the worm 16, which point radially inwards and have different lengths in the radial direction. Transponders 36 are arranged in the bottom area of each of these depressions 34a and 34b and are passive components which emit a response signal in response to an electromagnetic amplitude-modulated signal. A transmitting/receiving device 38 that is suitable for this purpose is provided for this purpose outside the wall 20. The depressions 34a and 34b are also filled by a synthetic resin 35, possibly with ceramic particles, so that the worm 16 has approximately the same mechanical characteristics in the area of the depressions 34a and 34b as in the rest of the area. When the external diameter of the worm 16 decreases as a result of the progressive wear, then this has no effects until one of the transponders 36 which are arranged in the depressions 34a and 34b is exposed, and is destroyed shortly thereafter. In consequence, this destroyed transponder no longer supplies a signal to the transmitting/receiving device 38, so that an evaluation unit (which is not illustrated but is coupled thereto) indicates that the worm 16 has worn away to the depth of the relevant depression.

Different wear states can be indicated by suitable arrangement of two or more transponders 36 in different depressions 34a and 34b, or at different positions. Thus, while a radial decrease in diameter can be indicated in the present exemplary embodiment, transponders 36 can also indicate axial wear. All that is necessary for this purpose is to introduce the depressions from an at least partially radial direction in order that the signals which are returned from the transponder can be detected radially outside the worm 16.

The invention claimed is:

1. A system for detecting wear state comprising:
    an axial machine part including,
        a first component having a first wear period, the first component including a first radial depression of a first predetermined depth associated with the first wear period in which a first transponder is inserted and transmits a first signal associated with the first wear period, and
        a second component disposed over a portion of the first component, the second component having a second wear period different from the first wear period, the second component including a second radial depression of a second predetermined depth associated with the second wear period in which a second transponder is inserted and transmits a second signal associated with the second wear period;
    a transmitter/receiver disposed in radial relation to the axial machine part, the transmitter/receiver adapted to transmit a third signal to the first transponder and the second transponder and adapted to receive the first signal and the second signal in response to the third signal; and
    an evaluation unit communicatively coupled to transmitter/receiver and adapted to selectively determine expiration of the first wear period or the second wear period upon failure of the transmitter/receiver to receive the first signal or the second signal in response to the third signal.

2. The system for detecting wear state as claimed in claim 1, wherein the first transponder and the second transponder operate on the RFID (radio frequency identification) principle.

3. The system for detecting wear state as claimed in claim 1, wherein the first radial depression in which the first transponder is inserted and the second radial depression in which the second transponder is inserted are filled with synthetic resin.

4. The system for detecting wear state as claimed in claim 3, wherein the synthetic resin includes non-metallic filling particles.

5. The system for detecting wear state as claimed in claim 1, wherein the first signal of the first transponder is different from the second signal of the second transponder enabling the evaluation unit to distinguish the first signal from the second signal.

6. The system for detecting wear state as claimed in claim 1, wherein the axial machine part is a stamp press.

7. The system for detecting wear state as claimed in claim 1, wherein the axial machine part is a worm feed or a worm press.

8. The system for detecting wear state as claimed in claim 4, wherein the non-metallic filling particles are ceramic particles.

9. The system for detecting wear state as claimed in claim 1, wherein the second wear period of the second component is shorter than the first wear period of the first component.

10. The system for detecting wear state as claimed in claim 1, wherein the second component of the axial machine part is replaceable upon expiration of the second wear period that is before expiration of the first wear period of the first component.

11. The system for detecting wear state as claimed in claim 1, wherein the first transponder or the second transponder, or both the first transponder and the second transponder, are of an elongated shape having a length of about 10 mm to 20 mm.

12. The system for detecting wear state as claimed in claim 1, wherein the first component is made of a first material and the second component is made of a second material.

13. A residual material compactor system comprising:
an axial machine part including a plurality of annular ribs adapted to compress the residual material, the axial machine part including,
  at least one annular rib having a first wear period, the at least one annular rib including a first radial depression of a first predetermined depth associated with the first wear period in which a first transponder is inserted and transmits a first signal associated with the first wear period, and
  a tip disposed over a portion of the at least one annular rib, the tip having a second wear period different from the first wear period, the tip including a second radial depression of a second predetermined depth associated with the second wear period in which a second transponder is inserted and transmits a second signal associated with the second wear period;
a transmitter/receiver disposed in radial relation to the axial machine part, the transmitter/receiver adapted to transmit a third signal to the first transponder and the second transponder and adapted to receive the first signal and the second signal in response to the third signal; and
an evaluation unit communicatively coupled to transmitter/receiver and adapted to selectively determine expiration of the first wear period or the second wear period upon failure of the transmitter/receiver to receive the first signal or the second signal in response to the third signal.

14. The residual material compactor system as claimed in claim 13, further comprising a pressing device adapted to press the residual material, wherein the at least one annular rib is adjacent to and compresses the residual material to the pressing device.

15. The residual material compactor system as claimed in claim 13, wherein the first transponder and the second transponder operate on the RFID (radio frequency identification) principle.

16. The residual material compactor system as claimed in claim 13, wherein the first radial depression in which the first transponder is inserted and the second radial depression in which the second transponder is inserted are filled with synthetic resin.

17. The residual material compactor system as claimed in claim 16, wherein the synthetic resin includes non-metallic filling particles.

18. The residual material compactor system as claimed in claim 17, wherein the non-metallic filling particles are ceramic particles.

19. The residual material compactor system as claimed in claim 13, wherein the first signal of the first transponder is different from the second signal of the second transponder enabling the evaluation unit to distinguish the first signal from the second signal.

20. The residual material compactor system as claimed in claim 13, wherein the axial machine part is a stamp press.

21. The residual material compactor system as claimed in claim 13, wherein the axial machine part is a worm feed or a worm press.

22. The residual material compactor system as claimed in claim 13, wherein the second wear period of the tip is shorter than the first wear period of the at least one annular rib.

23. The residual material compactor system as claimed in claim 13, wherein the tip of the axial machine part is replaceable upon expiration of the second wear period that is before expiration of the first wear period of the at least one annular rib.

24. The residual material compactor system as claimed in claim 13, wherein the first transponder or the second transponder, or both the first transponder and the second transponder, are of an elongated shape having a length of about 10 mm to 20 mm.

25. The residual material compactor system as claimed in claim 13, wherein the at least one annular rib is made of a first material and the tip is made of a second material.

* * * * *